(12) United States Patent
Lam

(10) Patent No.: US 6,799,018 B1
(45) Date of Patent: Sep. 28, 2004

(54) WIRELESS TRANSMISSION COMMUNICATION SYSTEM AND PORTABLE MICROPHONE UNIT

(75) Inventor: Keith Lam, Santa Rosa, CA (US)

(73) Assignee: Phonic Ear Holdings, Inc., Petaluma, CA (US)

( * ) Notice: Subject to any disclaimer, the term of this patent is extended or adjusted under 35 U.S.C. 154(b) by 0 days.

(21) Appl. No.: 10/039,405

(22) Filed: Jan. 3, 2002

Related U.S. Application Data

(63) Continuation-in-part of application No. 09/286,081, filed on Apr. 5, 1999, now abandoned.

(51) Int. Cl.[7] .................................................. H04Q 7/20
(52) U.S. Cl. ........................ 455/100; 455/90.3; 381/301
(58) Field of Search ...................... 455/66.1, 74, 550.1, 455/556.1, 557, 575.1, 90.1, 100, 90.3, 350, 351; 381/361, 362, 364, 326, 356, 355, 380, 91, 92, 122, 301

(56) References Cited

U.S. PATENT DOCUMENTS

| | | | |
|---|---|---|---|
| 5,287,119 A | | 2/1994 | Drumm |
| 5,293,354 A | * | 3/1994 | Costabile ..................... 368/11 |
| 5,359,157 A | * | 10/1994 | Liu ............................. 181/129 |
| 5,359,448 A | | 10/1994 | Laszlo et al. |
| 5,563,951 A | | 10/1996 | Wang et al. |
| 5,697,363 A | | 12/1997 | Hart |
| 5,737,430 A | * | 4/1998 | Widrow ....................... 381/313 |
| 5,818,328 A | | 10/1998 | Anderson et al. |
| 6,010,216 A | * | 1/2000 | Jesiek ......................... 351/158 |
| 6,016,347 A | | 1/2000 | Magnasco et al. |
| 6,055,312 A | | 4/2000 | Pralus et al. |
| 6,130,953 A | | 10/2000 | Wilton et al. |
| 6,137,887 A | * | 10/2000 | Anderson .................... 381/92 |
| 6,236,969 B1 | | 5/2001 | Ruppert et al. |
| 6,512,830 B1 | * | 1/2003 | Orten .......................... 381/67 |

FOREIGN PATENT DOCUMENTS

JP 2002204489 * 7/2002 ............ H04R/1/10

* cited by examiner

Primary Examiner—Jean Gelin
(74) Attorney, Agent, or Firm—Myers Dawes Andras & Sherman

(57) ABSTRACT

A portable microphone unit for use in wireless transmission communication system is disclosed where the microphone unit includes a housing for containing at least one, but usually two or more, microphones for receiving a speaker's voice, coupled with IR, RF, or other types of signal emitters, wherein the microphone housing is attached at a free end of wearing element, made from a flexible or inflexible material. The wearing element is either shaped to sit on the speaker's body, such as around his neck, and place the microphone before the speaker's face and mouth or is made from a flexible material that may be bent into a desirable position. The microphones are situated with appropriate angles in between, thereby allowing the speaker to turn his head from side to side and still maintain a significant sound pressure level towards at least one microphone and achieve a strong signal.

17 Claims, 7 Drawing Sheets

WIRELESS TRANSMISSION COMMUNICATION SYSTEM AND PORTABLE MICROPHONE UNIT

RELATED APPLICATIONS

This application is a continuation-in-part of U.S. application Ser. No. 09/286,081, filed on Apr. 5, 1999, now abandoned, by inventors Yvonne Ho, Lynn Dahaney, and Keith Lam, which is incorporated in this application by this reference. The sole inventor for the invention claimed by this continuation-in-part application is Keith Lam.

FIELD OF THE INVENTION

The invention relates to wireless communication systems within the art of transmitting a signal from an emitter to a receiver. These systems include infrared ("IR") communication systems and radio frequency ("RF") communication systems as well as other types.

BACKGROUND OF THE INVENTION

Systems including stationary microphones may be used for transforming a sound signal to an electrical signal, which is modulated, using modulating electronics, for IR transmission. The modulating electronics may be connected to a stationary IR emitter, which transmits the modulated signal. An IR receiver, mounted for example in a headset or a body-pack, may be provided to listeners who are located in a relevant environment and who desire to receive the emitted signal. The received signal is demodulated in demodulating electronics and transferred to earphones worn by the listener. The receivers and demodulating electronics may be connected to various other types of transmission equipment, such as loudspeakers, via external amplification systems.

Such stationary systems will only function in a satisfactory manner in a situation where the speaker is in a stationary position, such as a conference situation, where the speaker usually stands behind a podium speaking directly to an audience before him. However, a number of situations may arise where the stationary system is insufficient, due to the speaker's need to move into different positions, such as in the educational environment of schools, universities and the like. A teacher in a classroom may need to walk back and forth among the students, write on a blackboard facing away from the students, and move his head from side to side to capture the attention of the student audience on all sides. An actor on a stage may present another example of a situation where the stationary microphone/emitter units fail to be adequate.

Handheld microphone/emitter units exist but are not convenient for a speaker using them. The speaker is unable to use both hands and at the same time hold the microphone in a correct position. This is inconvenient in many situations, namely for a speaker in an educational environment who wishes to write on the board with one hand and hold a book with the other.

Headsets that are mounted on the head of the speaker and include a microphone that is mounted on a boom, again, solve some but not all of the problems associated with stationary systems. These headsets are undesirable as many find that the head mounting interferes with their hair and is generally uncomfortable.

Clip-on type microphones solve some but not all of the problems of the stationary microphone/emitter systems. These type of microphones pick up background noise and are prone to acoustic feedback. Moreover, in a classroom environment, the speaker usually moves and rotates his head from side to side. Some movements and rotation of the speaker's head from side to side often weakens the sound pressure conveyed to the microphone, resulting in a weak signal that is poorly intelligible for the listeners.

Another available microphone system is the Collar™ microphone from Anchor. This system uses only one microphone. One of the problems with the Collar™ microphone is the variation in input sound pressure level when the user rotates his/her head from side to side causing a varying output to the listener.

Due to the above-mentioned disadvantages, the educational environments have only been able to use RF transmission systems. However, because the RF signal may travel beyond the intended classroom, these systems require a different transmission frequency to be used for each classroom. As a result, such systems may have limitations of use where the required number of frequencies cannot be provided. Further, in such systems, the transmitter and receivers have to be tuned to the same frequency, which may be cumbersome when a significant number of different frequencies are used.

Compared to the RF transmission systems, the IR transmission systems have the advantage of not being able to transmit a signal beyond the physical limitations of the environment, i.e., the walls, the floor and the ceiling of a classroom. As a result, the same transmission frequency may be used in adjacent classrooms in a school.

IR transmission and communications systems, on the other hand, have their own disadvantages. In order to remedy the disadvantages of stationary IR transmission systems, systems that include portable IR emitters and portable microphones may be used. The emitter transmits a signal, which is received by a stationary receiver. The signal is then processed and transmitted to stationary loudspeakers. The portable microphone and emitter normally are arranged as neckbands or clip-on units that are placed in front of the body of the user. Movements of the speaker's head may cause an insufficient input to the microphone due to variations in sound pressure levels and result in a similarly insufficient output. Additionally, this type of mounting may cause the body of the speaker to fall between the emitter and the receiver, thereby possibly blocking the IR signal emitted by the emitter from reaching the receiver. Due to these disadvantages and the like, the IR communication systems have been usually deemed deficient when used for non-stationary speakers.

SUMMARY OF THE INVENTION

It is an object of the present invention to provide a wireless communication system and/or a microphone system for use in connection with a wireless communication system, which allow the speaker to move his/her head from side to side without influencing the microphone input signal significantly. It is a further object to provide a microphone system or a wireless communication system having a microphone system, which does not interfere with the hair of the speaker and which allows the speaker to have both hands free for other uses while utilizing the system for speaking.

According to the embodiments of the invention disclosed in this specification, the above objectives may be achieved by a system including: at least two microphones for receiving a user's voice; modulation electronics in connection with the microphones for modulating the microphone signal; at least one signal emitter in connection with the modulation electronics adapted for transmitting a modulated microphone signal; a stationary part including at least one receiver for receiving the transmitted modulated microphone signal; and demodulating electronics in connection with the at least one receiver. The system further includes end transmission equipment, in which the at least two microphones form part of a single portable unit suitable for placement around the user's neck, wherein the unit includes a flexible wearing element having a free end, wherein the at least two microphones are placed in a fixed position in relation to the flexible wearing element, with an angle between the main direction of at least two microphones in the range of 30–180 degrees. The angle in various embodiments may range between 30–80 degrees, may be set at 60–120 degrees, or may be approximately 90 degrees.

BRIEF DESCRIPTION OF THE DRAWINGS

The following figures depict examples of various systems in accordance with embodiments of the present invention.

DETAILED DESCRIPTION

The statement of the problem in the Background section makes clear that a wireless communication system and a microphone system for use in connection with a wireless communication system and a method are needed which enable the speaker to move his/her head from side to side without influencing the microphone input signal significantly, which do not interfere with the hair of the speaker, and which allow the speaker to have both hands free for other uses while utilizing the system for speaking. Such system and method are presented here.

Figure 1:
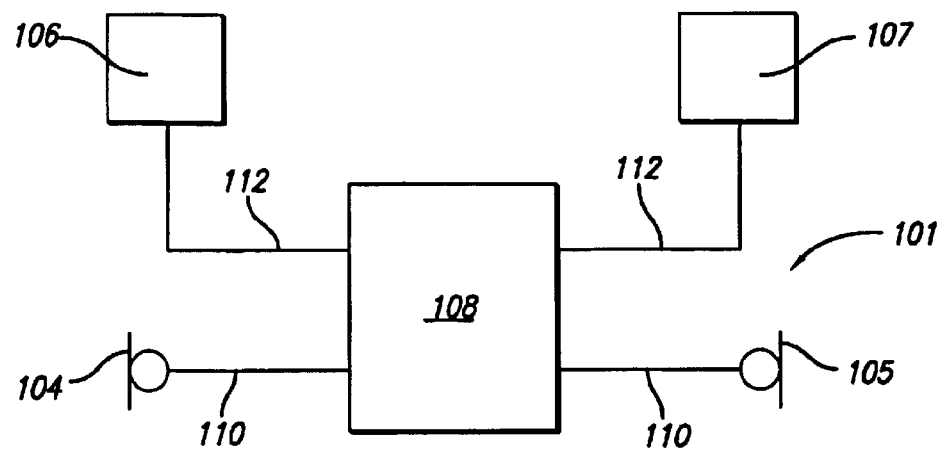
FIG. 1 is a diagram illustrating a communication system.
Figure 1:
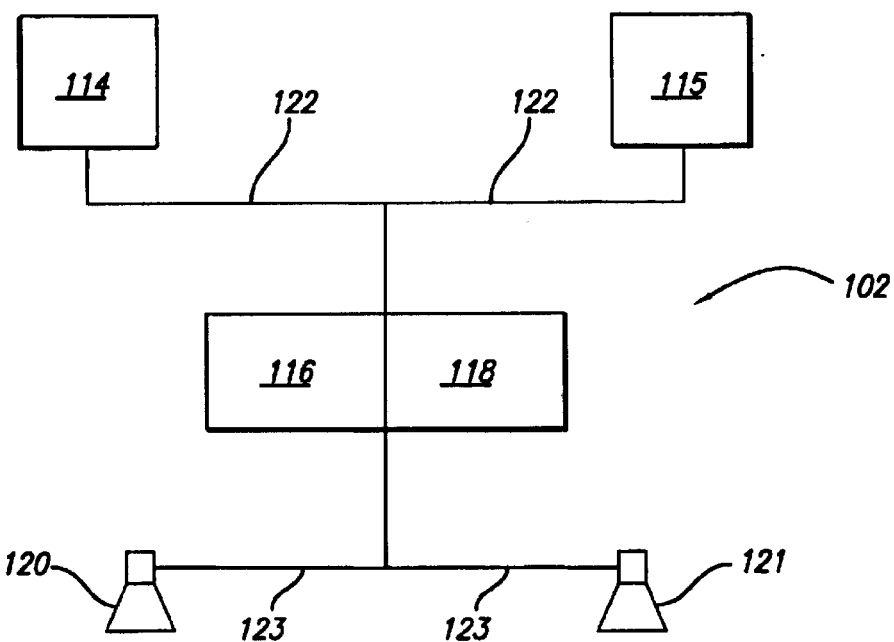

FIG. 1 is a diagram illustrating a communication system 100 in accordance with an embodiment of the present invention. As depicted in FIG. 1, the communication system 100 includes a speaker side system 101 and a listener side system 102.

The speaker side system 101 includes a microphone unit, in turn including two or more microphones, such as microphones 104 and 105, and one or more light emitting diodes ("LED"), such as LEDs 106 and 107, mounted on a collar. In one embodiment, the LEDs 106 and 107 use IR and are thus infrared light emitting diodes ("IRED"). In other embodiments, a radio frequency ("RF") transmission technology may be used in place of the IREDs. The RF signal-transmitting embodiment may utilize frequency modulation ("FM"). Microphone input signals are transferred to a modulating system 108 through wires 110 and, after modulation by the modulating system 108, through wires 112 to the LEDs 106 and 107 which emit a signal towards the listener side system 102. The transmissions depicted in FIG. 1 using wires 110, 112 may all be accomplished by other techniques or wirelessly. The speaker side system 101 may be powered by a battery.

The listener side system 102 includes one or more receivers, such as receivers 114 and 115, a demodulating system 116, an amplifier 118, and one or more speakers, such as speakers 120 and 121, for output of the received, demodulated, and possibly amplified signal. The listener side system 102 may be powered either by a battery or by any other available electrical power source. The listener side system 102 may be stationary, nonstationary and portable, or a combination of these. The listener side system 102 may include one or more loudspeakers or portable loudspeaker headsets. The modulating 108 and demodulating 116 electronics may be based on wireless transmission in the IR and RF areas.

Figure 2:
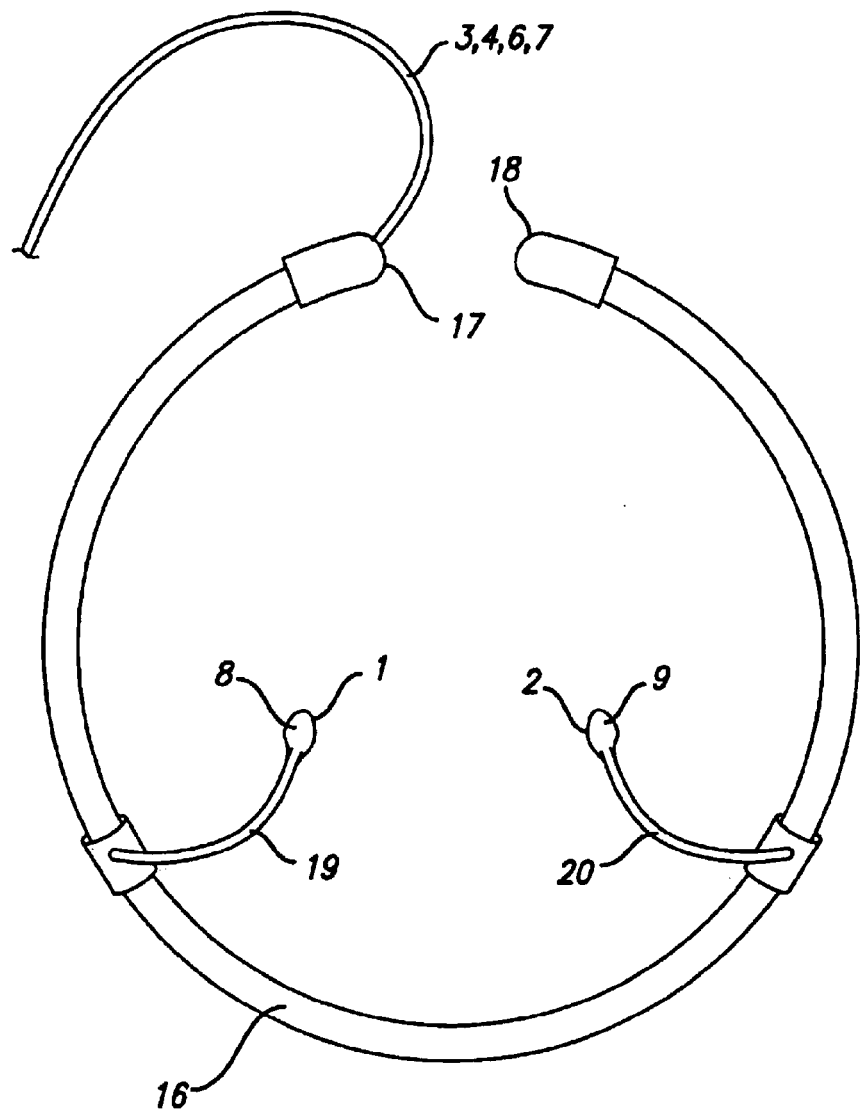
FIG. 2 is a diagram illustrating a front view of a first microphone/emitter unit.

FIG. 2 is a diagram illustrating a front view of a first microphone/emitter unit. The microphone unit comprises a collar-like curved element 16, having two free ends 17, 18, which are intended to be located at the rear side of the user's neck when the microphone unit is mounted. The two microphones 1, 2 are mounted on two arms 19, 20 protruding from the collar 16 in such manner that the microphones may have a mutual distance of between 2 and 6 inches. This may, however, be different depending on the characteristics of the microphones. The LED's 8, 9 are mounted on the same protruding arms 19, 20.

Figure 3:
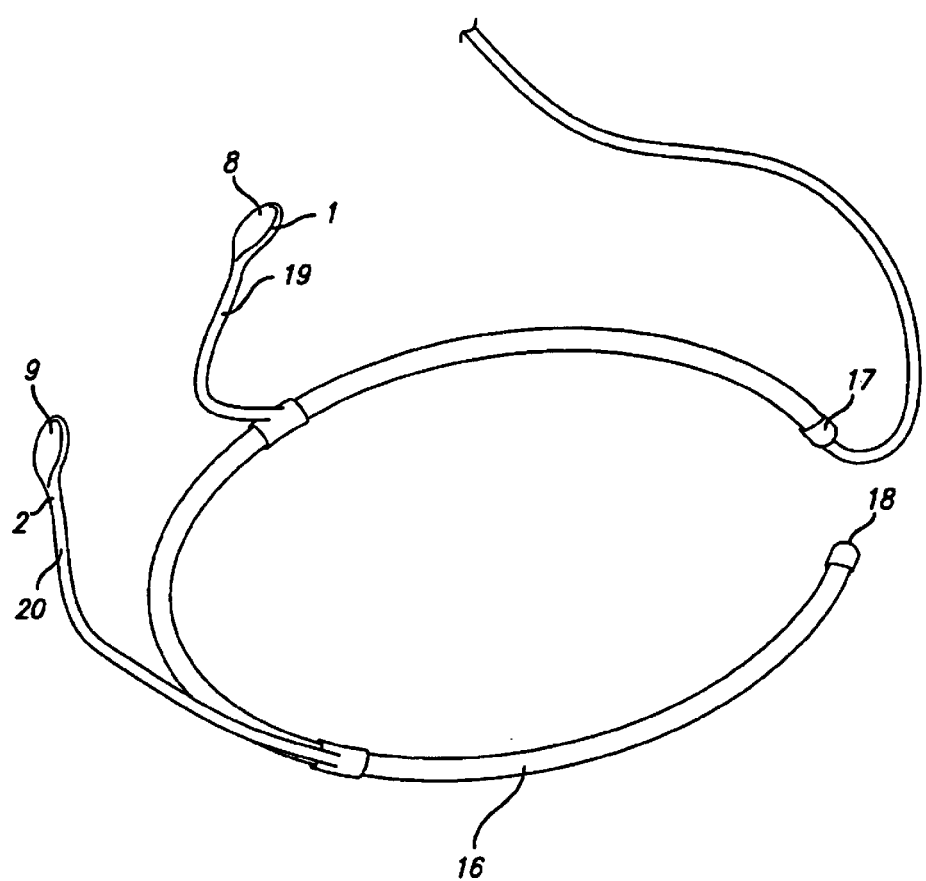
FIG. 3 is a diagram illustrating a perspective view of the first microphone/emitter unit.

FIG. 3 is a diagram illustrating a perspective view of the first microphone/emitter unit. Arms 19, 20 protrude somewhat from the curved element 16 adapted for mounting around the user's neck, whereby the microphones 1, 2 are brought closer to the user's mouth and an improved input is achieved.

Figure 4:
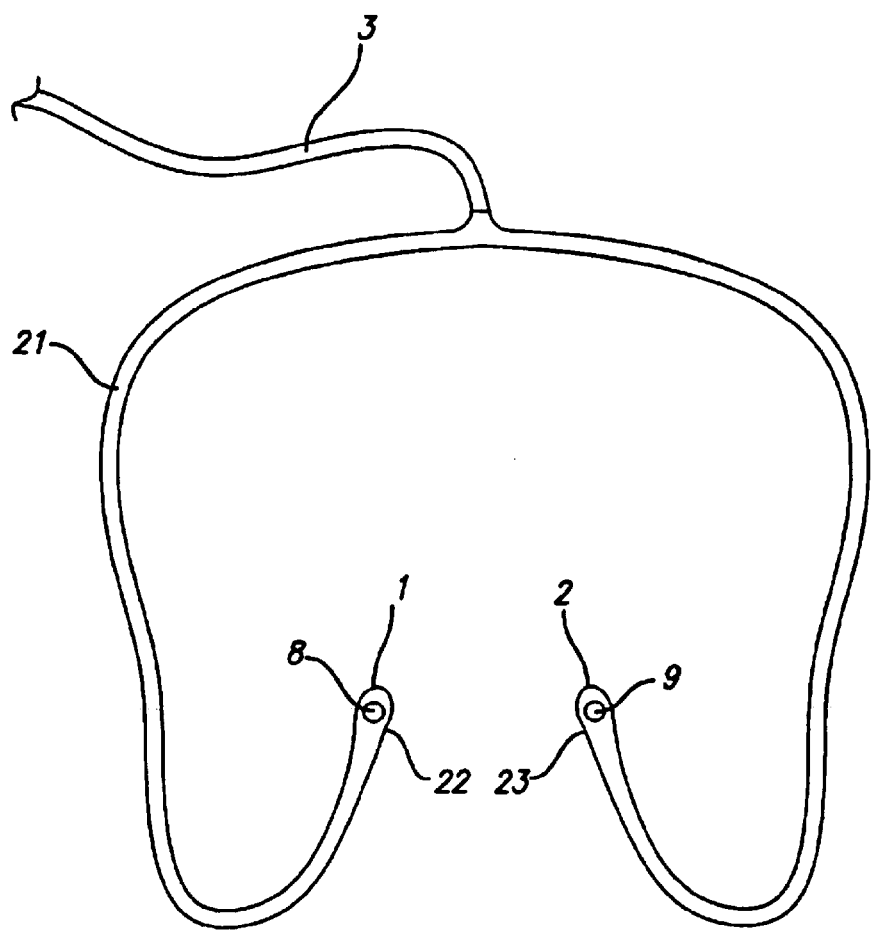
FIG. 4 is a diagram illustrating a front view of a second embodiment microphone/emitter unit.

FIG. 4 is a diagram illustrating a front view of a second embodiment microphone/emitter unit. The microphone unit comprises a collar-like curved element 21 having two free ends 22, 23 intended to be located at the front of the user's neck when the microphone unit is mounted. The two microphones 1, 2 are mounted at the ends 22, 23 of the curved element 21 in such manner that the microphones may have a mutual distance of between 2 and 6 inches. The LED's 8, 9 are mounted adjacent the microphones at the ends 22, 23 of the curved element 21.

Figure 5:
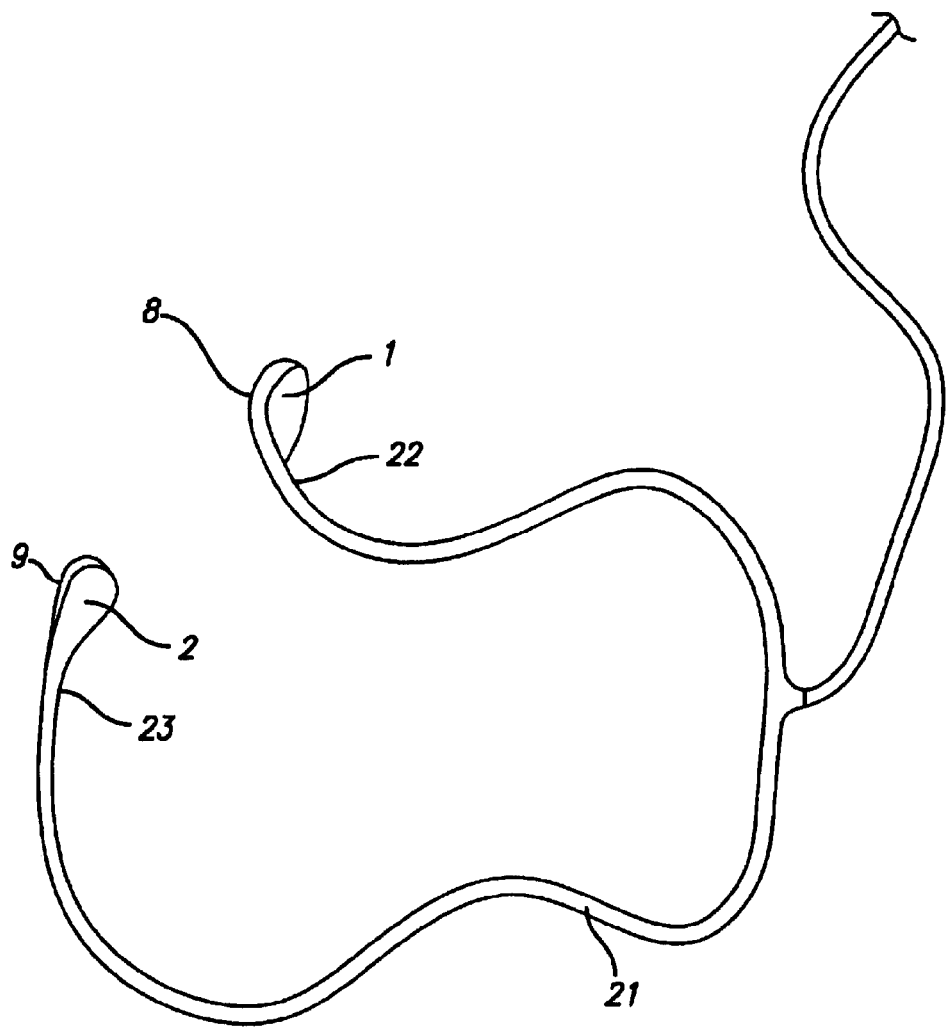
FIG. 5 is a diagram illustrating a perspective view of the second microphone/emitter unit.

FIG. 5 is a diagram illustrating a perspective view of the second microphone/emitter unit. The curved element is somewhat bent at a short distance from the ends in order to bring the microphones closer to the user's mouth and thereby achieve an improved input.

Figure 6:
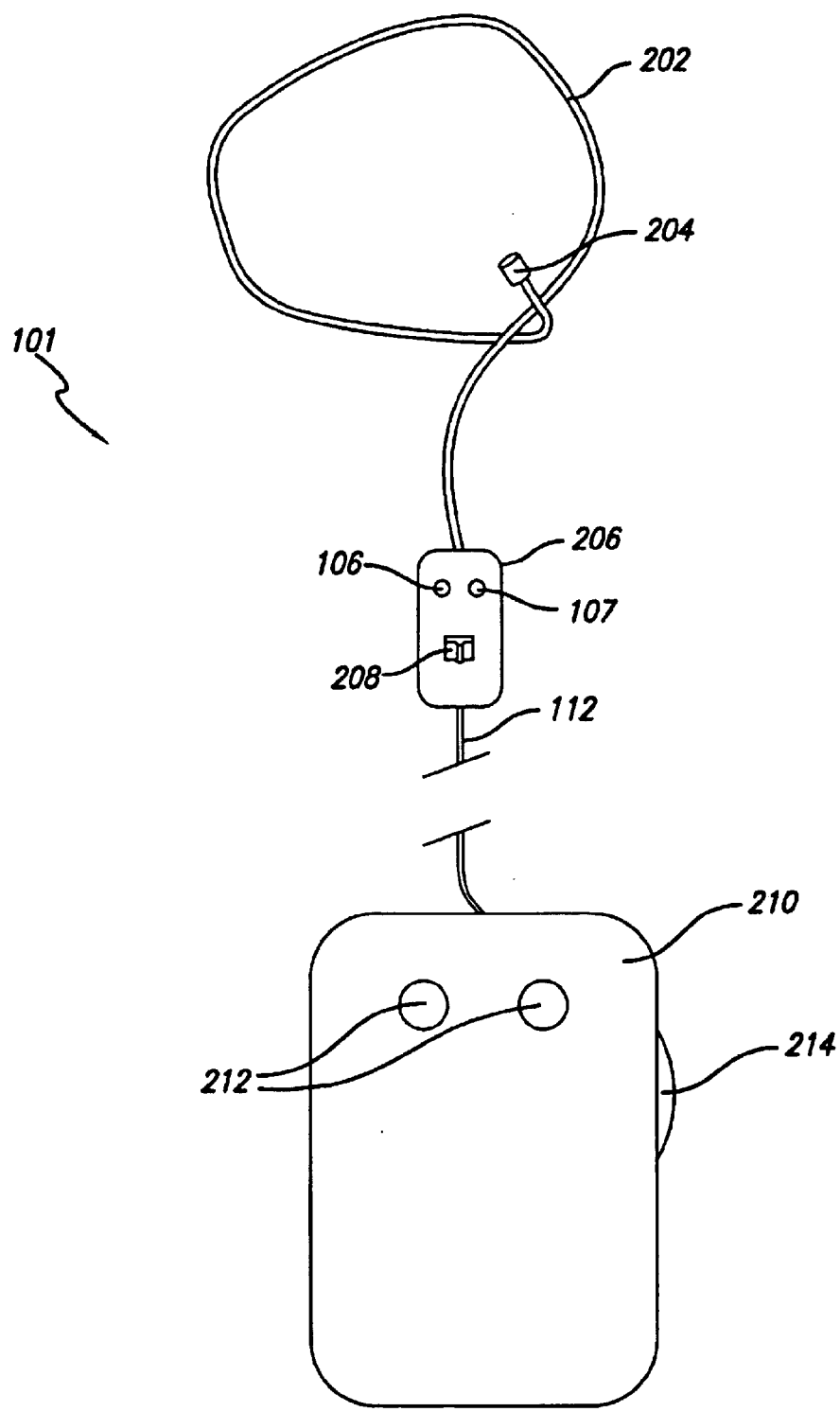
FIG. 6 is a diagram illustrating a front view of a speaker side of the communication system.
Figure 8:
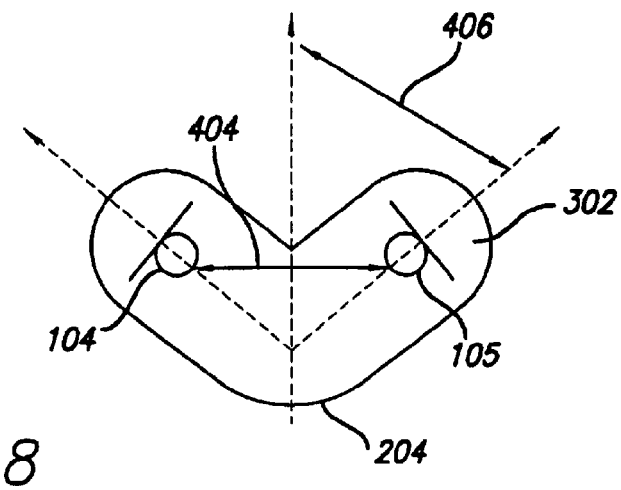
FIG. 8 is a diagram illustrating a top view of the microphone housing unit of FIG. 7.

FIG. 6 is a diagram illustrating a front view of the speaker side system 101 according to an embodiment of the invention. As depicted in FIG. 6, the speaker side system 101 includes a wearing element 202 having a free end with a microphone housing unit 204. In one embodiment of the invention, the LEDs 106 and 107 are placed in a housing 206 mounted on the wearing element 202. The LEDs may use various transmission technologies including IR or RF signal-transmitting systems that may in turn utilize FM. The microphones 104 and 105, shown in FIG. 1 and FIG. 8, are mounted at the free end, in the microphone housing 204, forming an angle in between. The angle between the microphones 104 and 105, shown in FIG. 8, may vary between 0 and 360 degrees. The angle will depend on the number of microphones, the desired coverage, and the characteristics of the microphones. In one embodiment, the angle may range between 30 and 180 degrees. The LED housing 206, further includes a mute switch 208. The mute switch may be used with various types of transmissions including FM transmission. A wire 112 may extend from the LED housing 206 to a box 210 containing modulating electronics and transmitting electronics. Box 210 includes indicators 212 and a channel selector button 214.

The wearing element 202 may be manufactured from a flexible material allowing the element to be flexed in a manner which allows placement around the neck of the user and positioning of the microphones in a desired position in front of the user's mouth. In one embodiment, the microphones may be placed at a distance from the chest of the user and close to the user's mouth.

In one embodiment, the wearing element 202 may be made of a goose-neck material which readily bends into various shapes and holds the shape. By the term goose-neck material any material or combination of material is meant, which are adapted for bending into a desired position or shape and are adapted for maintaining this shape until further bending. In another embodiment, a soft metal, like copper, may be utilized for the wearing element 202. Placing the wearing element around the user's neck secures the wearing element 202 with minimal interference with the user's hair or body. Further, in this position, the microphones are suitably located for receiving the user's voice. In other embodiments, the wearing element 202 may be angular. In yet other embodiments, the wearing element 202 may be made of inflexible material that are suitably shaped to sit on the user's body such that the microphones 104 and 105 locate appropriately with respect to the speaker's head.

The emitters 106 and 107 may be positioned adjacent to the microphones 104 and 105 or along the wearing element 202. Positioning the IR emitter(s) 106 and 107 in front of the speaker's mouth and at a distance from the head and the chest, prevents the blocking of the emitter 106 and 107 with respect to the receiver by the body of the speaker to some considerable extent. Also placing the IR emitters 106 and 107 adjacent to the microphones 104 and 105 reduces the potential for blocking of the signal because in this position, the emitters 106 and 107 are somewhat distanced from the user's body.

In other embodiments, instead of an IR emitter 106 and 107 and its corresponding modulating electronics, RF transmitting equipment may be used. Modulating electronics, for example FM electronics may be used with RF transmitters and an antenna may be used to provide for the transmission.

In one embodiment, one IR emitter may be provided as a signal emitter. In another embodiment two or more IR emitters may be provided, where the two or more emitters are positioned to cover different transmission areas. Such positioning significantly reduces the blocking of the IR signals. In the embodiments that use two IR emitters, the emitters may be electrically connected in parallel, thereby reducing power consumption and circuit size. In another embodiment, three IR emitters may be used. Using three or more emitters provides for an even wider coverage and the presence of more emitters provides for backup in case one of the emitters fails. In one embodiment, an antenna may be provided as a signal emitter for transmission of RF signals, such as FM signals. As the function of the multiple-microphone unit is not dependent on the type of the transmission equipment used, this embodiment is capable of providing the same benefits for an RF transmission system as for an IR transmission system.

Figure 7:
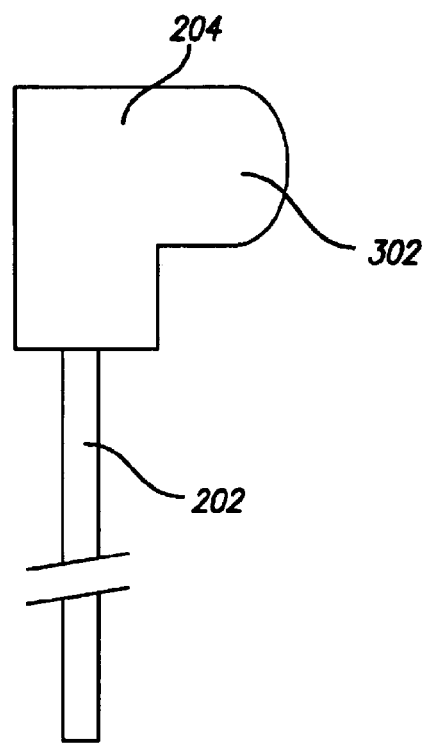
FIG. 7 is a diagram illustrating a side view of a microphone housing unit.

FIG. 7 is a diagram illustrating a side view of the microphone housing unit 204. The housing unit includes one or more compartments 302 for placing of the two or more microphones 1. The housing unit 204 is mounted at the free end of the wearing element 202.

FIG. 8 is a diagram illustrating a top view of the microphone housing unit 204 of FIG. 7. The microphones 104 and 105 are placed in the microphone compartments 302 of the housing. In one embodiment, depicted in FIG. 7 and FIG. 8 the microphone compartments 302 are protruding angular spaced parts. The angle 404 between the two microphones, after they are placed in the housing units, is shown in FIG. 8. The angle 406 in the depicted embodiment is about 45 degrees from the mid line corresponding to 90 degrees for the angle 404 between the two microphones. The microphone housing unit 204 depicted in FIG. 8 shows two chambers 302 and is capable of housing two microphones. In other embodiments, the housing unit 204 may be shaped to be able to house one microphone or more than two microphones.

The angle between the microphones 104 and 105 may help provide a more uniform reception of the voice signal coming from the speaker's mouth. In one embodiment, the microphones 104 and 105 may include directional microphones, that are built to differentiate sound pressure coming from the front or from behind (mechanical delay). Further, each microphone may have a particular coverage pattern, for example a cardioid pattern for unidirectional microphones, and putting two or more microphones together creates a new pattern of response. As a result, the microphones 104 and 105 may be arranged in a pattern shaped to cover the horizontal head rotation of the speaker, which is usually about 30 degrees on either side of the position of the head when facing straight ahead. Additionally, using directional microphones results in less feedback compared to unidirectional microphones.

The angle between the microphones 104 and 105 may be varied depending on the type of microphones used. Although the microphones may be placed in the same housing, each microphone may have its own inlets, front and back, and its own acoustic chamber. In one embodiment, at least two microphones may be connected in series, thereby reducing their sensitivity and lessening mechanical noise such as clothing noise or rubbing noise.

In the embodiment depicted in FIG. 7 and FIG. 8, as the microphones 104 and 105 form part of a single unit, they are put to a single operation which facilitates the use of the system 100. In this embodiment, because the microphones 104 and 105 are placed in a fixed position with equal angular distances from the center, it is possible to provide an optimal position in front of the user's mouth independent of the user's position of the head, thereby providing an adequate microphone input signal independent of the position of the user's head. The foregoing description of the embodiments of the invention is by way of example only, and other variations of the above-described embodiments and processes are provided by the present invention. Many variations are possible in light of the foregoing teachings. The method and system described are limited only by the claims that follow.

What is claimed is:

1. A system comprising:
    a portable microphone unit comprising:
    at least two microphones capable to receive a speaker's voice;
    modulating electronics, coupled to the at least two microphones, capable to modulate the voice into a signal;
    at least one signal emitter, coupled to the modulated electronics, capable to emit the modulated signal; and a wearing element comprising an elongate carrier element with a free end, wherein the at least two microphones are placed in a fixed relative position at the free end of the wearing element with an angle in between each microphone's main directions in the range of 30–180 degrees, and wherein the at least two microphones are placed such that their main directions project frontward.

2. The system of claim 1, wherein the at least two microphones are connected in series.

3. The system of claim 1, further comprising:

a single housing for the at least two microphones.

4. The system of claim 2, wherein the housing is molded to hold the at least two microphones at a desired angle with respect to one another, allowing the speaker to turn his head from side to side and still maintain a significant sound pressure level towards at least one microphone of the at least two microphones.

5. The system of claim 1, wherein the at least one signal emitter includes an IR emitter.

6. The system of claim 5, wherein at least two IR emitters are provided as signal emitters and wherein the IR emitters are positioned to cover different transmission areas.

7. The system of claim 6, wherein the at least two IR emitters are electrically connected in parallel.

8. The system of claim 1, wherein the at least one signal emitter includes an RF emitter.

9. The system of claim 8, wherein an antenna is provided as a signal emitter for transmission of RF signals.

10. The system of claim 9, wherein the RF signal emitters include FM signal emitters.

11. The system of claim 1, wherein the wearing element includes a goose-neck flexible material capable of assuming different shapes.

12. The system of claim 1, wherein the wearing element includes a flexible metal rod.

13. The system of claim 1, wherein the wearing element includes a rigid material.

14. A system comprising:

at least two microphones for receiving a speaker's voice;

modulating electronics coupled to the microphones for modulating the voice into an electric signal; and at least one signal emitter coupled to the modulating electronics capable to transmit the modulated signal;

wherein the microphones form part of a single portable unit suitable for placement around a speaker's neck, wherein the unit comprises a flexible wearing element comprising an elongate carrier element having a free end, wherein the at least two microphones are placed at the free end of the flexible wearing element with a fixed angle with respect to one another allowing the speaker to turn his head from side to side and still maintain a significant sound pressure level towards at least one microphone; and wherein the at least two microphones are placed such that each microphone's main direction projects frontward.

15. The system of claim 14, further comprising:

at least one receiver for receiving the signal;

demodulating electronics coupled to the at least one receiver; and end transmission equipment.

16. A method comprising:

providing at least two microphones for receiving a speaker's voice;

modulating the received voice into an electrical signal; and transmitted the modulated signal;

wherein the microphones form part of a single portable unit suitable for placement around a speaker's neck, wherein the unit comprises a wearing element comprising an elongate carrier element having a free end, wherein the at least two microphones are placed at the free end of the wearing element with a fixed angle with respect to one another allowing the speaker to turn his head from side to side and still maintain a significant sound pressure level towards at least one microphone, and wherein the at least two microphones are placed such that each microphone's main direction projects frontward.

17. A system, comprising:

at least two microphones means for receiving a speaker's voice, each microphone means having a main direction;

modulating electronic means coupled to the microphones means for modulating the voice into electrical signals; and at least one signal emitter means coupled to the modulating electronic means adapted for transmitting the signal;

wherein the microphone means form part of a single portable unit means for placement around a speaker's neck, wherein the unit means comprises a wearing element means comprising an elongate carrier element having a free end, wherein the at least two microphone means are placed at the free end of the wearing element with a fixed angle with respect to one another allowing the speaker to turn his head from side to side and still maintain a significant sound pressure level towards at least one microphones, and wherein the at least two microphone means are placed such that their main directions project frontward.

* * * * *